March 28, 1961 K. COOK 2,977,530

CIRCUIT INDICATOR DEVICE FOR WIRED CONTROL PANELS OF BUSINESS MACHINES

Filed May 16, 1958 3 Sheets-Sheet 1

INVENTOR.

Kenneth Cook

BY

Munn, Liddy, Daniels & March

ATTORNEYS

March 28, 1961

K. COOK 2,977,530

CIRCUIT INDICATOR DEVICE FOR WIRED CONTROL PANELS OF BUSINESS MACHINES

Filed May 16, 1958

3 Sheets-Sheet 2

INVENTOR.
Kenneth Cook
BY
Munn, Liddy, Daniels & March
ATTORNEYS

March 28, 1961 K. COOK 2,977,530

CIRCUIT INDICATOR DEVICE FOR WIRED CONTROL PANELS OF BUSINESS MACHINES

Filed May 16, 1958 3 Sheets-Sheet 3

INVENTOR.
Kenneth Cook

BY

Munn, Liddy, Daniels & March

ATTORNEYS 2,977,530

CIRCUIT INDICATOR DEVICE FOR WIRED CONTROL PANELS OF BUSINESS MACHINES

Kenneth Cook, Bayside, N.Y., assignor to Walter R. Oreamuno & Co., New York, N.Y., a firm Filed May 16, 1958, Ser. No. 735,855

13 Claims. (Cl. 324—51)

The invention relates generally to the field of electrical or electronic business machines, and more particularly to electrical indicator devices for use with such machines, to facilitate the tracing and checking out of circuits and associated components on business-machine control panels.

The described embodiment of the present invention is illustrated in conjunction with a control panel of the type used with electrical or electronic business machines wherein punched cards or the like, or similar records, are used to present or store desired information. Business machines of this type are intended to be quite flexible in their operation, and to be adaptable to various uses and purposes. In accomplishing such flexibility or adaptability these machines commonly employ an electrical contact or plug-in type of control board or panel having a multiplicity of circuit elements or contacts, together with means by which such elements may be wired or interconnected to form various circuit patterns.

Such a control panel, depending on the size and adaptability of the business machine, may have a very large number of circuit or contact elements arranged on it in a predetermined pattern. For example, as many as five thousand some odd contact elements may be provided on a single panel, for the purpose of effecting desired controls to produce the various functions required of the machine. In conjunction with such large number of contact elements, numerous interconnecting wires are provided, and said wires are provided with plug-type terminals or tips adapted to be received in openings or hubs on the panel whereby the tips may constitute the contact elements of the control panel.

With this organization the task of properly wiring a control panel or altering a wired control panel to effect certain desired circuits and functions becomes quite complicated, involved and time-consuming. Due to the large number or multiplicity of circuit elements involved, the likelihood for error is often quite great. The setting-up or arranging and rearranging of these control panels thus represents a considerable part of the entire set-up time for the machine, and moreover requires the services of skilled personnel (who exhibit varying degrees of proficiency), further adding to the cost of the operation.

The above disadvantages and drawbacks attendant the wiring or setting-up of control panels for a business machine are in large part obviated by the present invention, and one object of the invention is to provide a novel and improved method and apparatus which greatly facilitates the wiring or setting-up procedure required by the control panels of business machines. By the use of the present improved method and apparatus the setting-up or wiring time for such a panel is greatly reduced, as is also the likelihood of error in such operation.

In accomplishing the above objective I provide a novel method and a unique yet relatively simple indicator device for use with the said control panels, said device in its simplest form comprising essentially an indicator board, having thereon a multiplicity of electrical indicators in an arrangement similar to that of the contact or tip holders or openings of the control panel, and a connector board having a multplicity of connectors, said board being adapted for superposition on the control panel to effect circuit connections between the latter and the indicators of the indicator board.

In conjunction with such indicator and connector boards I further provide a manually movable contact probe adapted to be temporarily engaged with any of the multiplicity of contact elements of the connector board one at a time (which elements have the same arrangement as the contact or tip holders of the control panel), and are adapted to be respectively engaged with control panel tips or contacts. When my improved electrical indicator device is thus associated with the control panel of a business machine, a quick and easy check may be had and visually indicated of all circuits and components carried by the control panel.

It sometimes occurs that a completely wired control panel will not function properly when placed in the business machine, and will not effect a proper control of the operations of the machine, thereby resulting in faulty results or work, and downtime as a consequence of locating the error or fault and correcting the same. Such fault of the control panel may be due to breaks in the wiring thereof, or else due to loose wires or poor contacts established between the wires and the tips.

Another object of the present invention is to provide an improved method and apparatus for quickly and visually checking a wired control panel to ascertain the presence of broken or loose wires, or poor connections, and for quickly and easily locating such faults, thereby insuring that the control panel after such a check will function properly in the machine without the likelihood of faulty work and down time.

Due to the complexity of the wired control panels with their multiplicity of contact elements and wires it is possible for even a skilled operator to misdirect or improperly place certain of the wires.

A further object of the invention is to provide a simple and improved method and apparatus as above stated and which will also quickly, visually indicate misdirected or improperly connected wires in a wired control panel, and indicate and locate other defects in the wiring or circuits regardless of their cause.

The matter of training personnel so that they may become skilled in setting up and wiring control panels is also of importance in the operation of electronic business machines.

Another object of my invention is to provide an improved method and apparatus as above characterized, which lends itself readily to classroom demonstration and dissertation, and which facilitates the teaching of wiring techniques to relatively large groups as well as to small groups or individuals.

A feature of the present invention resides in the provision of an improved method and apparatus by which the wiring of a questionable, wired control panel may be quickly and accurately checked against the wiring of a correctly wired control panel. This further facilitates the setting-up of control panel wiring and the location of faults, even though these latter may be quite obscure. Also, in consequence of this feature of the invention an operator, starting with a correctly wired control panel may quickly and accurately assemble or wire one or several duplicate control panels having the same circuit patterns as the original panels.

It is sometimes desired, for effecting certain controls or functions of the business machine, to include in the wiring of the control panel one or more filter elements or other control components. Such filter elements, for example, may be incorporated in certain of the connecting wires which are used in wiring the panel.

A further object of the present invention is to provide a simple and improved method and apparatus for visually, electrically checking wired control panels, whereby the presence and location of filter and other electronic devices contained in the wired circuits of the control panel may be readily indicated.

Still another object of the invention is to provide an electrical indicator device of the type above characterized, having all of the features and advantages mentioned and which is nevertheless extremely simple in its construction and relatively economical to fabricate and produce.

Other features and advantages will hereinafter appear.

In the drawings accompanying this specification, similar characters of reference are used to designate like components throughout the several views, in which.

Figure 1:
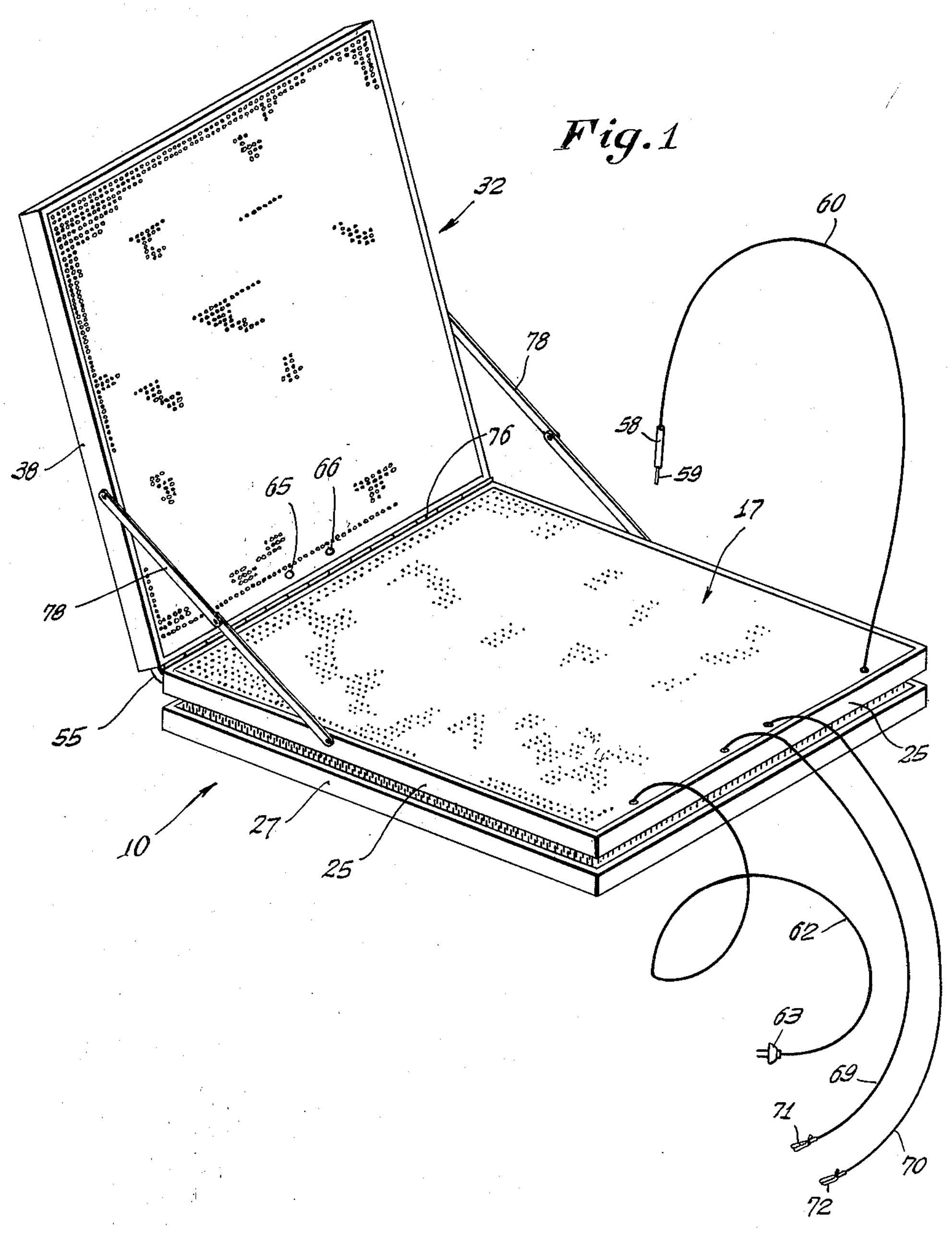
Figure 1 is a perspective view of the device of the invention, about to be applied to a usual type of control panel for a business machine.
Figure 2:
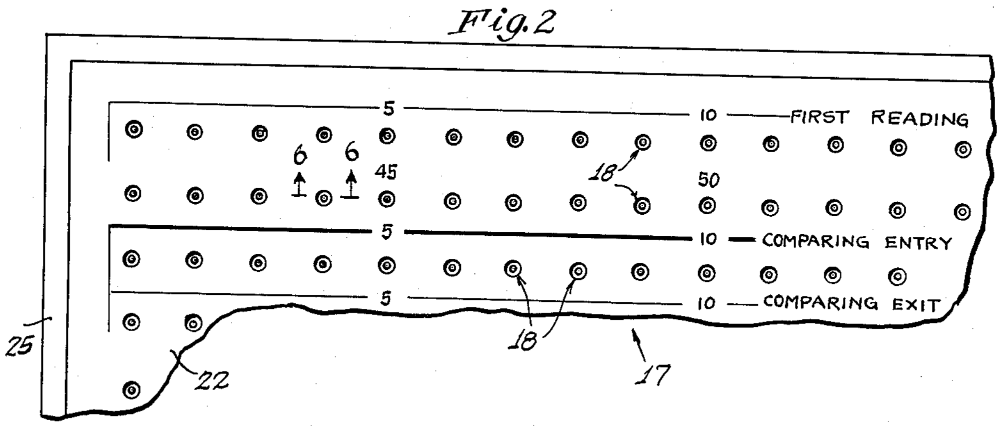
Fig. 2 is a fragmentary, top plan view of the connector board portion of the device shown in Fig. 1.
Figure 6:
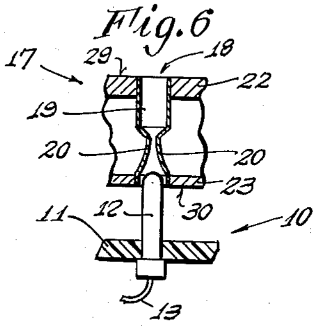
Fig. 6 is a fragmentary sectional view through the connector board and control panel of the business machine when these are in the relative positions indicated in Fig. 1; the section through the connector board may be similar to a section taken on the line 6—6 of Fig. 2.

As stated above, the present electrical indicator device is shown in conjunction with a usual type of control panel for a business machine, and referring to Figs. 1 and 6 such a control panel is indicated generally by the numeral 10. Panels of this type are commonly constituted of a rigid, somewhat thick rectangular sheet 11 of insulating material such as phenolic plastic or the like, having a large number of openings or hubs through it, in which there may be disposed contact pins or tips 12 connected to the ends of connecting wires 13. The tips 12 may have any suitable means by which they are uniformly positioned in the sheet 11.

An ordinary control panel may have a field comprising a relatively large number of rows and columns of such openings; for example, in one direction the rows may have up to 64 openings, and there may be 80 rows extending across the panel. It is understood that the rows may be provided either with the full number of holes or with a lesser number, depending on the particular arrangement. A completely wired control panel has pins or tips 12 occupying a fractional part of the total number of holes or hubs in the panel, as determined by the number and disposition of the connecting wires 13 on which the pins or tips are provided.

In accordance with the present invention I provide, for cooperation with a control panel such as that indicated by the numeral 10, a novel electrical and visual indicator device having a connector or receptacle board or panel 17, hereinafter also called a base member, said connector board being adapted for superposition on the control panel 10 and being provided with a contact field comprising a multiplicity of predeterminately positioned electrical contact elements adapted to engage respectively the pins or tips 12 which are carried by the control panel 10 when the connector board is superposed thereon. In Figures 1 and 6 the connector board 17 is shown as juxtaposed to the control panel 10 for the purpose of applying the board to the panel to effect respective engagement between the various pins or tips 12 and contact elements on the board.

Figure 7:
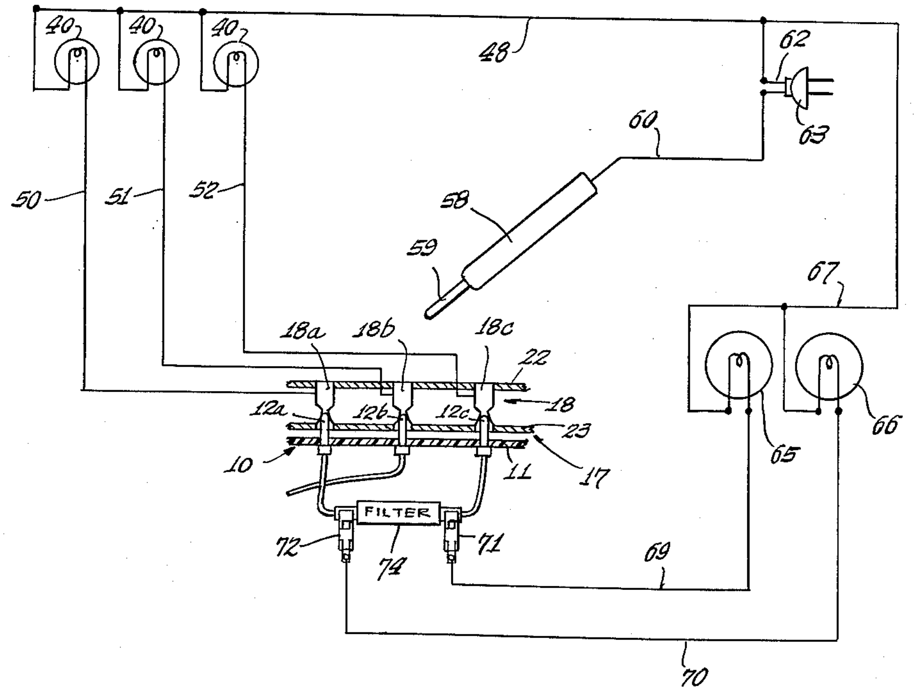
Fig. 7 is a pictorial representation, including a schematic diagram, for the purpose of illustrating the circuit of the device of the invention.

Referring to Figs. 6 and 7, the contact elements on the board 17 are indicated generally by the numerals 18, and such elements may be advantageously constructed as resilient electrical jacks or sockets of tubular shape, having tubular body portions 19 and opposed, resilient contact portions or fingers 20. The connector board 17 may be advantageously constituted of two rigid sheets 22 and 23 disposed in spaced, superposed relation to each other and having registering openings in which the contact elements or jacks 18 are disposed. It will, of course, be understood that the arrangement of the jacks 18 on the connector board 17 is similar to the arrangement of the holes or hubs in the control panel 10, or more properly in the insulating sheet 11 thereof, thereby to effect registration between any contact tips 12 carried by the control panel and the corresponding electrical jacks 18 of the connector board as the latter is applied to the control panel.

The rigid sheets 22 and 23 making up the connector board 17 may be mechanically joined to each other to any suitable manner. As shown in Figs. 1 and 6 they may be held in spaced relation by a suitable rectangular marginal frame 25 of approximately the same size and configuration as the frame 27 of the control panel 10.

It will be seen from Figs. 6 and 7 that the connector board 17 has expansive, oppositely disposed, faces 29 and 30 as provided respectively by the outer surfaces of the rigid sheets 22 and 23. Moreover, the contact elements or jacks 18 are seen to extend between the opposite faces 29 and 30 of the connector board 17, and to not protrude beyond such faces. Not only will the jacks 18 receive the pins or tips 12 as the latter are brought to and through the rigid sheet 22, but the contact elements or jacks have accessible portions at the face 29 of the connector board, as constituted by the tubular body portions 19 of such jacks. This construction constitutes an important feature of the invention in that it enables electrical contact to be established to any of the jacks 18 for testing and indicating purposes, after the connector board 17 has been superposed on and applied to the control panel 10, as will be shortly brought out in detail.

Figure 5:
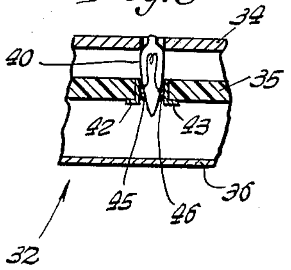
Fig. 5 is a fragmentary horizontal sectional view, taken on the line 5—5 of Fig. 4.
Figure 3:
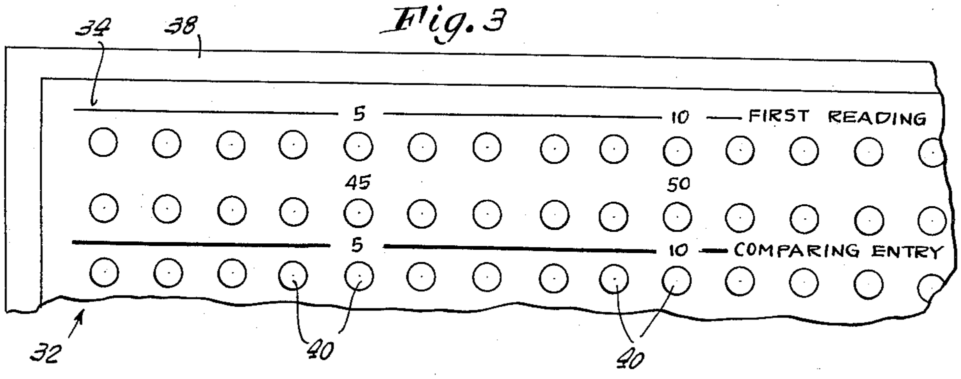
Fig. 3 is a fragmentary front elevational view of the indicator board portion of the device illustrated in Fig. 1.

My improved electrical indicator device further comprises an indicator board 32, Figs. 1 and 3, carrying an indicator field comprising a plurality of electrical indicators predeterminately positioned thereon in an arrangement similar to the arrangements of the contact elements 18 on the connector board 17 and the openings for the pins or tips 12 of the control panel 10. The electrical indicators on the indicator board 32 are thus disposed in rows and columns, as indicated in Fig. 1, and such electrical indicators may be advantageously constituted of miniature incandescent electric lamps, as for example the type of lamp commonly referred to as a "grain of wheat." A representation of this construction is shown in Fig. 5, wherein the indicator board 32 is illustrated as constituted of three superposed, spaced rigid sheets 34, 35, and 36. The sheets 34, 35, and 36 may be mechanically joined in any suitable or desired manner, as for example by a rectangular marginal frame 38, Figs. 1 and 3.

Figure 4:
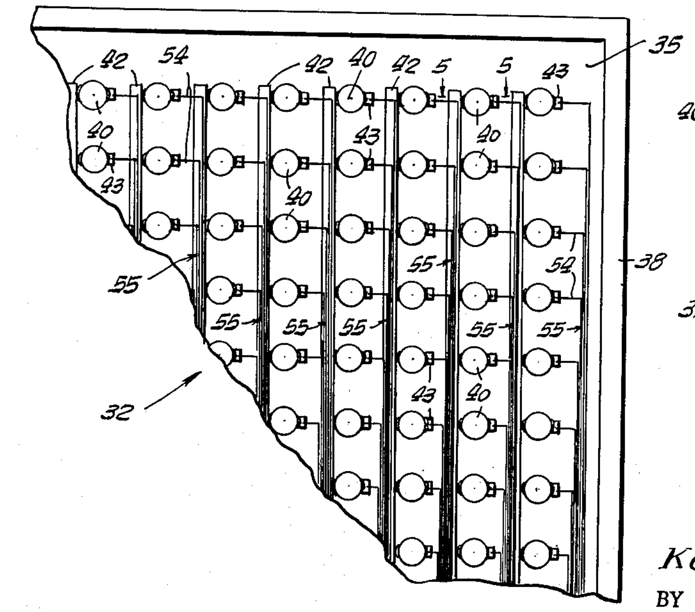
Fig. 4 is a fragmentary rear elevational view of the indicator board of Figs. 1 and 3, showing certain of the circuit connections to the indicators carried by the board.

As seen in Fig. 5, the sheets 34 and 35 may have registering openings in which the indicator lamps, designated 40, may be disposed. Such indicator lamps, moreover, may be advantageously of the type wherein the glass envelope mounts a pair of oppositely disposed contacts 42 and 43, by which current is brought to the filament of the lamp. With such organization the sheet 35 may be provided with pairs of oppositely disposed socket-forming contacts 45, 46, one pair being provided for each opening in the sheet. One contact of each of said pairs, furthermore, may be constituted as part of a strip whereby a common circuit is established for one side of each of the indicator lamps 40. Such common circuit may be represented by the wire 48 shown in Fig. 7. The other contacts of the pairs 42, 43 are, in accordance with the invention, individually connected to correspondingly located jacks 18 on the connector board 17. In Fig. 7 three of the indicator lamps 40 are illustrated, connected by means of wires 50, 51 and 52 with three separate jacks 18*a*, 18*b* and 18*c* respectively on the connector board. It will be understood, however, that large numbers of the lamps 40 and jacks 18 are employed. For example, a total of somewhat over five thousand of the tiny or miniature lamps 40 may be carried by the indicator board 32. Where such indicator board has 64 columns and eighty rows of bulbs, there may be a total of 5,120 bulbs or lamps. Corresponding to this number of lamps 40 there would be 5,120 jacks 18, and each jack would be connected by a separate wire to an individual one of the lamps 40. In Fig. 4, showing the rear of the rigid sheet 35, wires 54 are illustrated, and such wires may be formed into cables 55 (see Fig. 1 also) which may then extend between the connector board 17 and the indicator board 32.

Further, in accordance with the present invention, I provide an electrical probe 58 having a conducting tip 59 which is adapted to be received in any of the jacks 18 of the connector board 17. The tip 59 may be readily inserted in the body portion 19 of a jack, by virtue of its smaller diameter, and may thus be made to effect electrical contact between the probe and the particular jack in which the tip is inserted. From the probe 58 a wire 60 is brought, such wire being flexible as indicated in Fig. 1 and being connected to a terminal adapted to be energized from a suitable source of electricity. The wire 48, Fig. 7 is likewise connected to an accompanying terminal, and such terminals may be joined to an electric cord 62 provided with a connector plug 63 of the type usable with a low voltage source of energy. For example, if the lamps 40 are three volt lamps, then the plug 63 would be connected to a three volt source, which might be a step down transformer and rectifier, or battery.

It will be understood that other means may be employed for obtaining a suitable voltage for the lamps 40; such means constitutes no part per se of the present invention and accordingly are not shown herein in detail.

I further provide, in accordance with the present invention, additional electrical indicators on the indicator board 32, such indicators being shown in Fig. 7 as incandescent lamps 65 and 66. The lamps 65, 66 are connected to a common wire 67 which is joined to the wire 48 seen in Fig. 7. The other sides of the lamp circuits are connected with flexible leads 69 and 70 which respectively carry alligator clips 71, 72 or the like by which the leads may be electrically connected to opposite sides or terminals of any filter elements which might be incorporated in the circuit or wiring of the control panel. In Fig. 7 one such filter element 74 is illustrated, although it will be understood that other elements may be included in the control panel wiring, and also circuit components other than filters may be employed in place of or in addition to the filters.

Referring to Fig. 1, the connector board 17 and indicator board 32 may be advantageously mechanically connected together by a hinge means such as that indicated at 76. Also, articulated braces 78 may be provided, connecting the boards together in a manner such that the indicator board 32 may be either folded against the connector board 17 for storage, or else swung away from the connector board to an angular operative position as shown in Fig. 1 when the device is to be put into use.

Referring to Fig. 7 it will be understood that the control panel 10, 11 may have a large number of the pins or tips 12, jointed by interconnecting wires, and some of such wires may include filters such as the filter 74, or other circuit components.

In accordance with the method of the invention, the circuit pattern of a wired control panel 10 is checked and ascertained by connecting to the contact tips of such panel a plurality of the electrical indicator lamps 40, connecting a source of electricity through a common wire to all of the said lamps, and connecting the other terminal of the source of electricity temporarily to various contacts or tips of the wired control panel one after another. When this is done, the indicator lamps 40 will be energized either singly or in different groups or patterns, such as are established by the wiring of the control panel. The method of the invention also embraces the connecting of an additional indicator lamp, such as the lamp 65 or 66, to one side of a filter element on the control panel, the other side of the lamp being energizing from the common or ground wire attached to the indicator lamps 40. Also, as shown in Fig. 7, both the lamps 65 and 66 may be connected to opposite sides or terminals of a filter element on the control panel. Then, when the probe 58 is touched to any of the various jacks 18 not only will the indicator lamps 40 light up and exhibit certain patterns, but also the lamps 65 and 66 may function to indicate the presence, location and functioning of the filter element 74.

The operation of the present improved electrical indicator device or apparatus will now be described in detail. The connector board 17, after being superposed on and applied to the control panel 10, will have the corresponding electrical jacks 18 engaged with the pins or tips 12 of the control panel, and in consequence those lamps 40 which are connected with the engaged jacks 18 will have their circuits connected with the pins or tips 12 on the control panel 10. Since all of the lamps 40 have a common connection to the source of electricity, and since such source is also connected to the probe 58, 59 it will now be understood that when the probe is engaged with one of the jacks 18 it will cause energization of the corresponding single lamp 40 which is directly connected to the said jack. However, such act of inserting the probe 58, 59 in one jack may also cause energization of a number of other lamps 40, depending on the wiring which has been set up on the control panel 10. For example, if the jack 18*a* shown in Fig. 7 is engaged by the probe 58, this may cause energization of the jack 18*c* through the filter element 74, or if instead of such filter element there were merely a wire connection between the two pins 12*a* and 12*c*, then the jack 18*c* would be fully energized by virtue of the probe 58 being inserted in the jack 18*a*. In consequence of this latter condition, the rightmost one of the three bulbs 40 shown in Fig. 7 would also be energized. Thus, inserting the probe 58 in various jacks 18 may energize either single lamps 40 or a number of such lamps, according to the circuit pattern as established by the wiring of the control panel 10. Moreover, if such wiring should include a rectifier-type filter element such as the filter 74, it could cause energization of one or both of the lamps 65, 66 (depending on polarities of the current source and rectifier), thereby indicating the presence and/or the polarity of the filter in the circuit, and also indicating the location of such filter. If the filter 74 (or other circuit component employed in place of the filter) is of a type which attenuates the current, or if it effects a discontinuity for the type of energization supplied to the plug 63, then the relative energization and/or brilliance of the lamps 65, 66 will indicate the presence and location of the filter, or in the event that the lamps 65, 66 do not show illumination, a discontinuity will be indicated.

It will now be understood from the foregoing that by the use of my present electrical and visual indicator device in conjunction with a control panel of a business machine it is possible, by manipulation of the probe 58 and by observing the various lighted lamps and the patterns thereof, to quickly and accurately ascertain the pattern of the connections or circuits which have been effected on the control panel. By virtue of the visual indication and the ease of changing connections rapidly through use of the probe 58 it is possible for an operator to set up a control panel with the greatest facility and in a minimum amount of time. Moreover, either while making connections or while testing a panel which is already wired, the operator may readily detect broken or loose wires by observing the lighted patterns on the indicator board 32. In a like manner, it is possible to quickly and accurately detect misdirected or improperly connected wires of the control panel, and to detect any other defects in the wiring circuit of such panel.

Moreover, my improved visual, electrical indicator readily lends itself to classroom demonstration and dissertation, and is a valuable aid in teaching the various wiring techniques either to individuals or to relatively large groups. Through the use of the present indicator device it is possible to compare the wiring of two control panels which are already wired, and also possible to duplicate in another control panel the wiring of a given control panel.

Various other uses and advantages will suggest themselves to those skilled in the art; variations and modifications may be made within the scope of the claims, and portions of the improvements may be used without others.

I claim:

1. An electrical device for indicating the circuit pattern of a wired control panel for a business machine, comprising a generally flat, expansive base member having the form of a board, said member being adapted for superposition on the control panel and being provided with a contact field comprising a large multiplicity of predeterminately positioned electrical contact elements adapted to engage respectively cooperable contacts on the control panel when the base member is superposed thereon, said contact elements having accessible portions at the exposed side of the superposed base member; an expansive indicator means separate from and movable with respect to the base member and having an indicator field comprising a plurality of electrical indicators predeterminately positioned in an arrangement similar to those of the said contact elements and contacts; a common circuit connected with one side of the circuits of each of said indicators; flexible circuit means connecting the remaining sides of the circuits of the said indicators respectively to said contact elements; an electrical probe adapted to be temporarily engaged with any of the accessible portions of said contact elements; and means for connecting said probe and common circuit respectively to terminals of a source of electricity suitable for energizing said indicators whereby the act of touching the probe to any one of the said contact elements may energize certain of the indicators in a pattern determined by connections existing between contacts of the said control panel.

2. An electrical device for indicating the circuit pattern of a wired, filter-carrying control panel for a business machine, comprising a generally flat, expansive base member having the form of a board, said member being adapted for super-position on the control panel and being provided with a plurality of predeterminately positioned electrical contact elements adapted to engage respectively cooperable contacts on the control panel when the base member is superposed thereon, said contact elements having accessible portions at the exposed side of the superposed base member; an indicator board having a plurality of electrical indicators predeterminately positioned thereon in an arrangement similar to those of the said contact elements and contacts; a common circuit connected with one side of the circuits of each of said indicators; circuit means connecting the remaining sides of the circuits of said indicators respectively to said contact elements; an electrical probe adapted to be temporarily engaged with any of the accessible portions of said contact elements; and means for connecting said probe and common circuit respectively to terminals of a source of electricity suitable for energizing said indicators whereby the act of touching the probe to any one of the said contact elements may energize certain of the indicators in a pattern determined by connections existing between contacts of the said control panel; and additional electrical indicator on said board, having one side of its circuit connected to said common circuit; a flexible lead connected to the other side of the circuit of the additional indicator, said lead having electrical connector means for attaching it to a terminal of a filter element on the control panel, thereby to supplement the indication of the pattern of the wired connections on the panel with an indication of the presence and location of the filter element.

3. An electrical device for indicating the circuit pattern of a wired, filter-carrying control panel for a business machine, comprising a generally flat, expansive base member having the form of a board, said member being adapted for super-position on the control panel and being provided with a plurality of predeterminately-positioned electrical contact elements adapted to engage respectively cooperable contacts on the control panel when the base member is superposed thereon, said contact elements having accessible portions at the exposed side of the superposed base member; an indicator board having a plurality of electrical indicators predeterminately positioned thereon in an arrangement similar to those of the said contact elements and contacts; a common circuit connected with one side of the circuits of each of said indicators; circuit means connecting the remaining sides of the circuits of said indicators respectively to said contact elements; an electrical probe adapted to be temporarily engaged with any of the accessible portions of said contact elements; and means for connecting said probe and common circuit respectively to terminals of a source of electricity suitable for energizing said indicators whereby the act of touching the probe to any one of the said contact elements may energize certain of the indicators in a pattern determined by the connections existing between contacts of the said control panel; two additional electrical indicators on said board, having one side of the circuit of each connected to said common circuit; a pair of flexible leads connected respectively to the other sides of the circuits of the additional indicators, said leads having electrical connector means for attaching them to the two terminals of a filter element on the control panel, thereby to supplement the indication of the pattern of the wired connections on the panel with an indication of the presence and location of the filter element.

4. An electrical device for indicating the circuit pattern of a wired control panel for a business machine, comprising a generally flat, expansive base member having opposite faces and the form of a board, said member being adapted for superposition on the control panel and being provided with a contact field comprising a large multiplicity of predeterminately positioned resilient electrical jacks adapted to engage respectively cooperable plugs on the control panel when the base member is superposed thereon, said jacks extending between opposite faces of the base member and having accessible contact portions at the exposed side of the member when the latter is superposed on the panel; an expansive indicator board separate from and movable with respect to the base member and having an indicator field comprising a plurality of electrical indicators predeterminately positioned thereon in an arrangement similar to those of the said jacks and plugs; a common circuit connected with one side of the circuits of each of said indicators; flexible circuit means connecting the remaining sides of the circuits of said indicators respectively to said jacks; an electrical probe adapted to be temporarily engaged with any of the accessible contact portions of said jacks; and means for connecting said probe and common circuit respectively to terminals of a source of electricity suitable for energizing said indicator whereby the act of touching the probe to any one of the said contact portions of the jacks may energize certain of the indicators in a pattern determined by the wire connections existing between plugs of the said control panel.

5. An electrical device for indicating the circuit pattern of a wired control panel for a business machine, comprising an expansive board-like base constituted of a pair of spaced insulating panels, said base having opposite faces and being adapted for superposition on the control panel, and further having a contact field comprising a large multiplicity of predeterminately positioned resilient electrical jacks adapted to engage respectively cooperable plugs on the control panel when the base member is superposed thereon, said jacks extending between opposite faces of the base member and having accessible contact portions at the exposed side of the member when the latter is superposed on the panel; an expansive indicator board having an indicator field comprising a plurality of electrical indicators predeterminately positioned thereon in an arrangement similar to those of the said jacks and plugs; a common circuit connected with one side of the circuits of each of said indicators; flexible circuit means connecting the remaining sides of the circuits of said indicators respectively to said jacks; an electrical probe adapted to be temporarily engaged with any of the accessible contact portions of said jacks; and means for connecting said probe and common circuit respectively to terminals of a source of electricity suitable for energizing said indicators whereby the act of touching the probe to any one of the said contact portions of the jacks may energize certain of the indicators in a pattern determined by the wire connections existing between plugs of the said control panel.

6. An electrical device for indicating the circuit pattern of a wired control panel for a business machine, comprising a generally flat, expansive base member having the form of a board, said member being adapted for superposition on the control panel and being provided with a contact field comprising a large multiplicity of predeterminately positioned electrical contact elements adapted to engage respectively cooperable contacts on the control panel when the base member is superposed thereon, said contact elements having accessible portions at the exposed side of the superposed base member; an expansive indicator board of insulating material having an indicator field comprising a plurality of pairs of socket-forming contacts predeterminately positioned thereon in an arrangement similar to those of the said contact elements and contacts; miniature electric lamps engaged with said socket-forming contacts; a common circuit connected with one of each pair of socket-forming contacts; flexible circuit means connecting the remaining socket-forming contacts respectively to said contact elements; an electrical probe adapted to be temporarily engaged with any of the accessible portions of said contact elements; and means for connecting said probe and common circuit respectively to terminals of a source of electricity suitable for energizing said lamps whereby the act of touching the probe to any one of the said contact elements may energize certain of the lamps in a pattern determined by the wire connections existing between contacts of the said control panel.

7. The invention as defined in claim 6 in which the miniature electric lamps comprise evacuated glass envelopes each having a pair of contacts, the contacts of the pairs being disposed on opposite sides of the envelopes, and in which the indicator board has openings, said lamps and socket-forming contacts being disposed in the said openings.

8. An electrical device for indicating the circuit pattern of a wired control panel for a business machine, comprising a generally flat, expansive base member having the form of a board, said member being adapted for superposition on the control panel and being provided with a contact field comprising a large multiplicity of predeterminately positioned electrical contact elements adapted to engage respectively cooperable contacts on the control panel when the base member is superposed thereon, said contact elements having accessible portions at the exposed side of the superposed base member; an expansive indicator board comprising three sheets secured together in spaced, superposed relation, the center one of said sheets being of insulating material, said board having an indicator field comprising a plurality of pairs of socket-forming contacts carried by the insulating sheet and predeterminately positioned thereon in an arrangement similar to those of the said contact elements and contacts; miniature electric lamps engaged with said socket-forming contacts; a common circuit connected with one of each pair of socket-forming contacts; flexible circuit means connecting the remaining socket-forming contacts respectively to said contact elements; an electrical probe adapted to be temporarily engaged with any of the accessible portions of said contact elements; and means for connecting said probe and common circuit respectively to terminals of a source of electricity suitable for energizing said lamps whereby the act of touching the probe to any one of the said contact elements may energize certain of the lamps in a pattern determined by the wire connections existing between contacts of the said control panel.

9. An electrical device for indicating the circuit pattern of a wired control panel for a business machine, comprising a generally flat, expansive base member having the form of a board, said member being adapted for superposition on the control panel and being provided with a contact field comprising a large multiplicity of predeterminately positioned electrical contact elements adapted to engage respectively cooperable contacts on the control panel when the base member is superposed thereon, said contact elements having accessible portions at the exposed side of the superposed base member; an expansive indicator board and means connecting the same and the base member together for relative movement, enabling said member and board to be superposed for storage or separated when in use, said indicator board having an indicator field comprising a plurality of electrical indicators predeterminately positioned thereon in an arrangement similar to those of the said contact elements and contacts; a common circuit connected with one side of the circuits of each of said indicators; flexible circuit means connecting the remaining sides of the circuits of said indicators respectively to said contact elements; an electrical probe adapted to be temporarily engaged with any of the accessible portions of said contact elements; and means for connecting said probe and common circuit respectively to terminals of a source of electricity suitable for energizing said indicators whereby the act of touching the probe to any one of the said contact elements may energize certain of the indicators in a pattern determined by the wire connections existing between contacts of the said control panel.

10. An electrical device for indicating the circuit pattern of a wired control panel for a business machine, comprising a generally flat, expansive base member having the form of a board, said member being adapted for superposition on the control panel and being provided with a plurality of predeterminately positioned electrical contact elements adapted to engage respectively cooperable contacts on the control panel when the base member is superposed thereon, said contact elements having accessible portions at the exposed side of the superposed base member and being disposed between opposite faces of the base member in non-protruding relation thereto; an indicator board and means hingedly connecting one edge of the same to one edge of the base member, thereby to enable said member and indicator board to be folded against one another in superposed relation for storage or unfolded to operative positions wherein they are disposed in angular relation, said indicator board having a plurality of electrical indicators predeterminately positioned thereon in an arrangement similar to those of the said contact elements and contacts, said indicators being disposed between the opposite faces of the indicator board in non-protruding relation thereto; a common circuit connected with one side of the circuits of each of said indicators; circuit means connecting the remaining sides of the circuits of said indicators respectively to said contact elements, said circuit means being constituted of wires formed into a cable extending between the board and member adjacent the hinge means thereof; an electrical probe adapted to be temporarily engaged with any of the accessible portions of said contact elements; and means for connecting said probe and common circuit respectively to terminals of a source of electricity suitable for energizing said indicators whereby the act of touching the probe to any one of the said contact elements may energize certain of the indicators in a pattern determined by the wire connections existing between contacts of the said control panel.

11. An electrical device for indicating the circuit pattern of a wired control panel for a business machine, comprising a generally flat, expansive base member having the form of a board, said member being adapted for superposition on the control panel and being provided with a plurality of predeterminately positioned electrical contact elements adapted to engage respectively cooperable contacts on the control panel when the base member is superposed thereon, said contact elements having accessible portions at the exposed side of the superposed base member and being disposed between opposite faces of the base member in non-protruding relation thereto; an indicator board and means hingedly connecting one edge of the same to one edge of the base member, thereby to enable said member and indicator board to be folded against one another in superposed relation for storage or unfolded to operative positions wherein they are disposed in angular relation, said indicator board having a plurality of electrical indicators predeterminately positioned thereon in an arrangement similar to those of the said contact elements and contacts, said indicators being disposed between the opposite faces of the indicator board in non-protruding relation thereto; a pair of articulated braces connected between the base member and indicator board for releasably holding the board in angularly-disposed operative position on the base member; a common circuit connected with one side of the circuits of each of said indicators; circuit means connecting the remaining sides of the circuits of said indicators respectively to said contact elements, said circuit means being constituted of wires formed into a cable, extending between the board and base member adjacent the hinge means thereof; an electrical probe adapted to be temporarily engaged with any of the accessible portions of said contact elements; and means for connecting said probe and common circuit respectively to terminals of a source of electricity suitable for energizing said indicators whereby the act of touching the probe to any one of the said contact elements may energize certain of the indicators in a pattern determined by the wire connections existing between contacts of the said control panel, said means for connecting the probe and common circuit including flexible leads passing to the base member adjacent an edge thereof which is remote from and parallel to the edge hingedly connected to the indicator board.

12. An electrical device for indicating the circuit pattern of a wired, filter-carrying control panel for a business machine, comprising a generally flat, expansive base member having the form of a board, said member being adapted for superposition on the control panel and being provided with a plurality of predeterminately positioned electrical contact elements adapted to engage respectively cooperable contacts on the control panel when the base member is superposed thereon, said contact elements having accessible portions at the exposed side of the superposed base member; an indicator board having a plurality of electrical indicators predeterminately positioned thereon in an arrangement similar to those of the said contact elements and contacts; a common circuit connected with one side of the circuits of each of said indicators; circuit means connecting the remaining sides of the circuits of said indicators respectively to said contact elements; an electrical probe adapted to be temporarily engaged with any of the accessible portions of said contact elements; and means for connecting said probe and common circuit respectively to the terminals of a source of electricity suitable for energizing said indicators whereby the act of touching the probe to any one of the said contact elements may energize indicators in a pattern determined by connections existing between contacts of the said control panel; two additional electrical indicators on said board, having one side of the circuit of each connected to said common circuit; a pair of flexible leads connected respectively to the other sides of the circuits of the additional indicators, said leads having electrical connector means for attaching them to the two terminals of a filter element on the control panel, thereby to supplement the indication of the pattern of the wired connections on the panel with an indication of the presence and location of a filter; and means hingedly connecting together two edges of the base member and indicator board to enable the same to be folded or opened in the manner of a book, said additional electrical indicators comprising lamps disposed on said board adjacent the hinged edge thereof.

13. An electrical device for indicating the circuit pattern of a wired, filter-carrying control panel for a business machine, comprising a generally flat, expansive base member having the form of a board, said member being adapted for superposition on the control panel and being provided with a plurality of predeterminately positioned electrical contact elements adapted to engage respectively cooperable contacts on the control panel when the base member is superposed thereon, said contact elements having accessible portions at the exposed side of the superposed base member; an indicator board having a plurality of electrical indicators predeterminately positioned thereon in an arrangement similar to those of the said contact elements and contacts; a common circuit connected with one side of the circuits of each of said indicators; circuit means connecting the remaining sides of the circuits of said indicators respectively to said contact elements; an electrical probe adapted to be temporarily engaged with any of the accessible portions of said contact elements; and means for connecting said probe and common circuit respectively to terminals of a source of electricity suitable for energizing said indicators whereby the act of touching the probe to any one of the said contact elements may energize indicators in a pattern determined by connections existing between contacts of the said control panel; two additional electrical indicators on said board, having one side of the circuit of each connected to said common circuit; a pair of flexible leads connected respectively to the other sides of the circuits of the additional indicators, said leads having electrical connector means for attaching them to the two terminals of a filter element on the control panel, thereby to supplement the indication of the pattern of the wired connections on the panel with an indication of the presence and location of a filter, said plurality of indicators comprising miniature electric lamps having contacts disposed on opposite sides of the glass envelopes thereof, and said additional indicators comprising large electric lamps disposed along a marginal portion of the said indicator board.

References Cited in the file of this patent

UNITED STATES PATENTS

| | | |
|---|---|---|
| 1,565,578 | McDonough | Dec. 15, 1925 |
| 2,229,927 | Kamper | Jan. 28, 1941 |
| 2,851,660 | Tobin et al. | Sept. 9, 1958 |